United States Patent [19]

Midha et al.

[11] Patent Number: 5,649,454
[45] Date of Patent: Jul. 22, 1997

[54] COMPLIANT CONSTANT-FORCE MECHANISM AND DEVICES FORMED THEREWITH

[75] Inventors: Ashok Midha, West Lafayette; Morgan Daniel Murphy, Kokomo, both of Ind.; Larry L. Howell, Provo, Utah

[73] Assignees: Purdue Research Foundation, West Lafayette; Delco Electronics Corporation, Kokomo, both of Ind.

[21] Appl. No.: 441,244

[22] Filed: May 15, 1995

[51] Int. Cl.$^6$ ............................................. G05G 1/04
[52] U.S. Cl. ............................................. 74/520; 267/160
[58] Field of Search ................ 74/520, 106; 248/280.11, 248/292.11; 267/160, 133, 185

[56] References Cited

U.S. PATENT DOCUMENTS

| | | | |
|---|---|---|---|
| 2,245,252 | 6/1941 | Cleghorn | 74/520 |
| 2,284,003 | 5/1942 | Luppert | 74/520 X |
| 2,532,850 | 12/1950 | May | 74/520 |
| 2,587,746 | 3/1952 | May | 74/520 |
| 2,996,805 | 8/1961 | Baker | 248/280.11 X |
| 3,892,138 | 7/1975 | Vomberg | 74/520 X |
| 4,193,365 | 3/1980 | Blessing | 74/520 X |
| 4,270,413 | 6/1981 | Dommer et al. | 74/520 X |
| 4,545,555 | 10/1985 | Koch | 248/280.11 |
| 5,108,061 | 4/1992 | Vlasak | 248/280.11 X |
| 5,299,770 | 4/1994 | Sayles | 248/280.11 X |

FOREIGN PATENT DOCUMENTS

| | | | |
|---|---|---|---|
| 949 494 | 8/1949 | France | 74/106 |
| 25 26 040 | 12/1976 | Germany | 74/520 |

OTHER PUBLICATIONS

Mechanics and Design of Cam Mechanisms, 1982, p. 349, by Fan Y. Chen.

Jenuwine and Midha, "Design of an Exact Constant Force Generating Mechanism," Proceedings of the 1st National Applied Mechanisms & Robotics Conf. vol. II, Cincinnati, OH, pp. 10B-4-1-10B-4-5 (1989).

Jenuwine and Midha, "Synthesis of Single-Input and Multiple-Output Port Mechanisms with Springs for Specified Energy Absorption", J. of Mech. Design, Trans. ASME, vol. 116, No. 3 (1994), pp. 937-943.

Primary Examiner—Rodney H. Bonck
Assistant Examiner—Mary Ann Battista
Attorney, Agent, or Firm—Domenica N. S. Hartman; Gary M. Hartman

[57] ABSTRACT

A compliant mechanism is configured to generate a substantially constant output force in response to an input in the form of a linear displacement. The compliant mechanism is a slider mechanism whose members and their interconnects cooperate to generate a biasing force that causes the slider mechanism to generate a substantially constant output force that is substantially parallel to the linear path of a reciprocable member in response to the displacement of the reciprocable member along the linear path. To achieve the above functional characteristics, the slider mechanism is composed of structural elements, one or more of which is compliant.

32 Claims, 5 Drawing Sheets

FIG.1a $$\begin{bmatrix} -1 & 1 & 0 & 1 \\ 1 & 0 & 2 & 0 \\ 0 & 2 & 0 & 1 \\ 1 & 0 & 1 & 0 \end{bmatrix}$$

COMPLIANT CONSTANT-FORCE MECHANISM AND DEVICES FORMED THEREWITH

The U.S. Government has rights to this invention pursuant to Grant No. MSS-8902777 awarded by the National Science Foundation.

BACKGROUND OF THE INVENTION

1. Field of the Invention

The present invention generally relates to mechanisms that are configured to produce a predictable output force in response to a linear input displacement. More particularly, this invention relates to a compliant mechanism that is capable of producing a substantially constant output force in response to a linear input displacement. Applications for such a compliant mechanism are diverse, and include such devices as electrical connectors in which a constant resistance force is desired during the connection procedure and throughout the life of the connector.

2. Description of the Prior Art

The use of springs as energy absorbers in mechanisms has a wide range of industrial applications, in that springs are capable of generating a predictable output force in response to a linear input displacement or deflection. However, there are many applications that would benefit significantly if the output force remained constant regardless of the amount of input deflection. Such applications include those in which a constant resistance force in response to a deflection is desired in order to prevent over-stressing and damage to components and structures.

Exact constant force mechanisms have been developed by Jenuwine and Midha using synthesis techniques, as disclosed in "Design of an Exact Constant Force Generating Mechanism," Proceedings of the 1st National Applied Mechanisms & Robotics Conference, Vol. II, Cincinnati, Ohio, pp. 10B-4-1–10B-4-5(1989); and "Synthesis of Single-Input and Multiple-Output Port Mechanisms with Springs for Specified Energy Absorption", Journal of Mechanical Design, Trans. ASME, Vol. 116, No. 3 (September 1994), pp. 937–943. These mechanisms employ two perpendicular linear springs acting on a rigid-body topology to obtain a constant force output, and illustrate the potential of a device that is capable of producing a substantially constant output force in response to a linear input displacement.

A notable application is electrical connectors, whose manufacturing tolerances are often of concern due to their significant effect on the assembly force required to make a complete connection. Automated assembly often entails the use of a constant assembly force. If the force exerted is too low relative to the force required to connect a particular assembly, a weak or incomplete connection may result due to insufficient travel of the connector. In contrast, if the assembly force is excessive so as to cause excessive travel of the connector, fracture or plastic deformation may result. In contrast, if the force required to make the connection were known and constant, the assembly force could be appropriately set to repeatably achieve the travel required to make a reliable connection.

Thus, it would be desirable to provide a relatively uncomplicated mechanism with which a predictable output force, and preferably a substantially constant output force, is produced in response to a linear input displacement to the mechanism. Such a mechanism would preferably be adaptable to various practical applications in which a constant resistance force in response to a deflection is desired, so as to prevent over-stressing of the components of the mechanism or the components being physically engaged by the mechanism.

In addition, such a mechanism should be capable of being manufactured with conventional materials and processing methods so as to yield a relatively light weight and inexpensive device. Moreover, such a mechanism should be scalable for applications as small as micro-electromechanical devices and as large as construction equipment.

SUMMARY OF THE INVENTION

It is an object of this invention to provide a compliant mechanism that is particularly adapted to produce a predictable and substantially constant output force in response to a linear input displacement to the mechanism.

It is another object of this invention that such a compliant mechanism be a slider mechanism having one or more compliant elements.

It is a further object of this invention that such a compliant mechanism be adaptable to applications in which a constant resistance force in response to a deflection is desired, so as to prevent over-stressing of the components of the mechanism and components being physically engaged by the mechanism.

It is a yet another object of this invention that such a compliant mechanism be applicable to use in connector devices, such as electrical connectors.

In accordance with a preferred embodiment of this invention, these and other objects and advantages are accomplished as follows.

According to the present invention, there is provided a compliant mechanism that can be readily configured to generate a substantially constant output force in response to an input in the form of a linear displacement. More particularly, the compliant mechanism includes a four-bar slider mechanism whose members and their interconnects cooperate to generate a biasing force that causes the slider mechanism to generate a substantially constant output force that is substantially parallel to linear path of a reciprocable member in response to the displacement of the reciprocable member along the linear path.

To achieve the above functional characteristics, the slider mechanism is composed of structural elements, at least one of which is compliant. The slider mechanism includes a base member that forms a frame of the slider mechanism, a pair of interconnecting segments, and a reciprocable member forming a slider for the slider mechanism. As is conventional with slider mechanisms, a first of the pair of segments is interconnected between the base member and the second segment, and the second segment is interconnected between the first segment and the reciprocable member. Furthermore, the reciprocable member is movable along a linear path relative to the base member, and the input to the slider mechanism is the displacement of the reciprocable member along the linear path.

The slider mechanism further includes a first connector pivotably interconnecting the first segment to the base member, a second connector pivotably interconnecting the second segment to the first segment, and a third connector pivotably interconnecting the second segment to the reciprocable member. At least one of the first, second and third connectors, and possibly one or both of the first and second segments, form a compliant means for biasing the first and second segments to be collinear with the linear path of the reciprocable member. The biasing means has a null position when the first and second segments are collinear so as to generate a torsional force about the reciprocable member of approximately zero, such that the slider mechanism is urged toward a stable condition in which the first and second segments are substantially collinear with the linear path. The lengths of the first and second segments are such that the biasing means causes the slider mechanism to generate a substantially constant force output parallel to the linear path of the reciprocable member in response to the displacement of the reciprocable member along the linear path.

In accordance with the above, a force required to displace the reciprocable member along the linear path will remain substantially constant along a significant portion of the linear path due to the presence of a compliant element within the slider mechanism. A significant advantage of such a capability is that, for a given application, the force necessary to displace the reciprocable member a required distance is substantially constant, and this constant force can be predetermined and controlled to the degree necessary to not exceed a maximum acceptable output force. Such a capability may be to prevent fracture or plastic deformation of components on which the force is applied or, as in the case of medical applications, to prevent injury to tissue being handled or clamped. Furthermore, devices incorporating the compliant mechanism of this invention can be employed with greater repeatability so as to enhance manufacturability, and greater reliability so as to minimize scrappage.

According to a preferred aspect of this invention, either or both of the segments can be compliant, and/or any one of the connectors can be formed to be compliant so as to form a flexural pivot between a pair of interconnected members of the slider mechanism. The compliant nature of the segments and connectors enables the generation of the biasing force necessary to align the segments with the linear path of the reciprocable member. Furthermore, the use of compliant elements within the slider mechanism makes possible a mechanism that can be manufactured with conventional materials and processing methods so as to yield a relatively light weight and inexpensive device.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1b is a simplified compliant mechanism matrix corresponding to the slider mechanism of FIG. 1a;

FIG. 1d is a pseudo-rigid-body model of the slider mechanism of FIG. 1a;

DETAILED DESCRIPTION OF THE INVENTION

A compliant mechanism is provided which is adapted to be capable of producing a predictable output force, and preferably a substantially constant output force, in response to a linear input displacement to the mechanism. As such, the compliant mechanism is adaptable to various practical applications in which a constant resistance force in response to a deflection is desired in order to prevent over-stressing of the components of the mechanism or the components being physically engaged by the mechanism. The compliant nature of the mechanism enables the mechanism to be manufactured with conventional materials and processing methods so as to yield a relatively light weight and inexpensive device.

While the compliant mechanism of this invention will be described in terms of generating a constant force, those skilled in the art will appreciate that the unique properties of the compliant mechanism enable many different variations of input-output relationships. As such, the teachings of this invention are not to be limited to devices and applications that produce a constant output force.

Figure 1A:
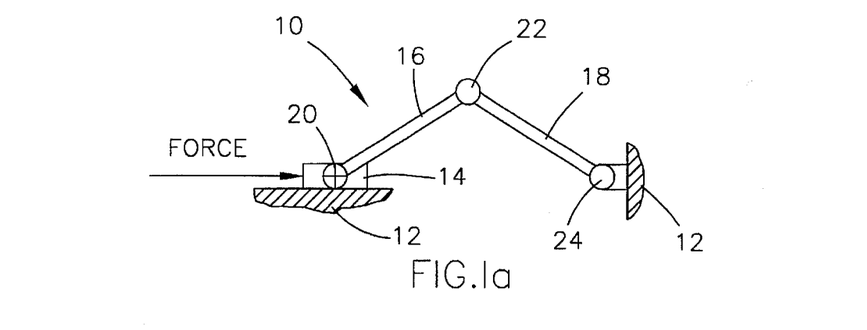
FIG. 1a is a schematic representation of a slider mechanism in accordance with a first embodiment of this invention.

FIG. 1a is a schematic representation of a compliant mechanism 10 in accordance with this invention. More particularly, the compliant mechanism 10 shown in the Figure is generally configured as a four-bar slider mechanism. In accordance with accepted nomenclature employed in the art, the slider mechanism includes a frame, a pair of links, a slider, and connectors at which pivotable movement occurs between adjacent members of the slider mechanism. In the following discussion, the link connected to the frame will be referred to as a crank, while the link connected to the slider will be referred to as a connecting rod. Those skilled in the art will appreciate that such nomenclature is not entirely precise, since the link connected to the frame is not free to rotate 360 degrees. However, use of these terms is convenient for distinguishing the locations of the links within the slider mechanism of this invention.

Furthermore, as used herein, pivotable interconnection and relative pivotable movement between adjacent members does not necessitate that each connector be a revolute joint that allows two members to freely rotate relative to each other. Instead, and as will become apparent from the following discussion, pivotable movement can be achieved with a connector in the form of a compliant, flexural pivot that generates a torsional force when pivotable movement between adjacent members occurs. Pivotable movement can also be achieved with a connector that is substantially rigid, i.e., a fixed connection, if at least one of the interconnected members is compliant, such that a torsional force is generated by pivotable movement between the adjacent members.

Referring to the specific embodiment of FIG. 1a, the compliant mechanism 10 includes a base 12, a reciprocable member forming a slider 14 for the slider mechanism, a first segment forming a connecting rod 16 of the slider mechanism, and a second segment forming a crank 18 of the slider mechanism. As is conventional with slider mechanisms, the slider 14 is movable along a linear path delimited by the base 12, and the input to the slider mechanism is the displacement of the slider 14 along the linear path. The slider mechanism further includes a first connector 20 pivotably interconnecting the connecting rod 16 to the slider 14, a second connector 22 pivotably interconnecting the crank 18 to the connecting rod 16, and a third connector 24 pivotably interconnecting the crank 18 to the base 12.

Figure 1B:
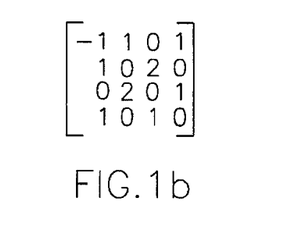
Figure 1C:
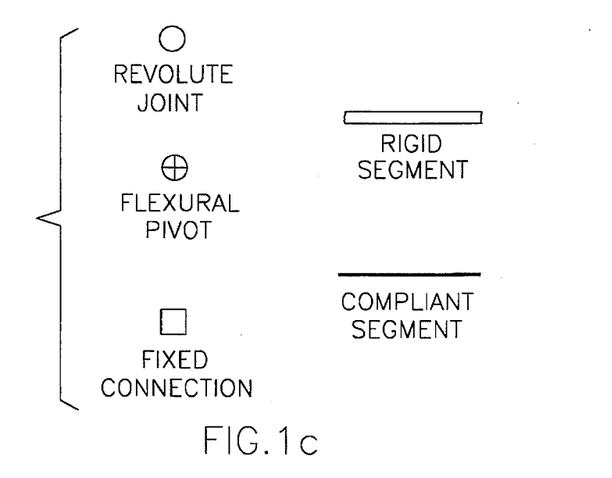
FIG. 1c identifies the symbol conventions employed in the Figures.

With reference to FIG. 1c, it can be seen that the connecting rod 16 and crank 18 are rigid segments, the first connector 20 is a flexural pivot, and the second and third connectors 22 and 24 are revolute joints. As used herein, the term "rigid" is used in contradistinction to "compliant", the latter term indicating sufficient compliance to allow flexure of a segment in order to generate a torsional moment, while the former term indicates the absence of any significant amount of compliance. Also, as noted above, the term "revolute joint" indicates that the second and third connectors 22 and 24 permit their interconnected members to pivot without generating a torsional moment, while the term "flexural pivot" indicates that the first connector 20 is a compliant structure that generates a torsional moment when pivotable movement occurs between its interconnected members. As such, the first connector 20 is adapted to generate a torsional moment between the slider 14 and the connecting rod 16. This torsional moment biases the connecting rod 16 and the crank 18 to be collinear with the linear path of the slider 14. Preferably, the connector 20 is in a null position such that the torsional moment is approximately zero when the connecting rod 16 and crank 18 are collinear.

In accordance with this invention, the lengths of the connecting rod 16 and crank 18 can be chosen such that the first connector 20 causes the slider mechanism to generate a substantially constant output force through the slider 14 and parallel to the linear path in response to the displacement of the slider 14 along the linear path.

A simplified compliant mechanism matrix (SCM) for the compliant mechanism 10 is shown in FIG. 1b. The entries in the SCM indicate the relative compliance of the segments and the connections of the mechanism 10. Position "1" is the base 12, position "2" is the slider 14, position "3" is the connecting rod 16 and position "4" is the crank 18. Compliance of the segments (base 12, slider 14, connecting rod 16 and crank 18) are entered in the diagonal direction, with the value "−1" indicating ground, the value "0" indicating a rigid segment, and the value "1" indicating a compliant segment. Compliance of the connections (first, second and third connectors 20, 22 and 24) are entered in the off-diagonal direction, with the value "0" indicating the absence of a direct connection, the value "1" indicating interconnection through a kinematic pair (a rigid-body joint, such as a revolute joint, prismatic pairs, and slider-type connections), the value "2" indicating interconnection through a flexural pivot, and a value "3" (not included in the matrix) indicating a fixed (rigid) connection.

Figure 2A:
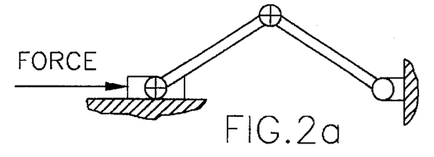
FIGS. 2a through 2z are schematic representations of slider mechanisms in accordance with further embodiments of this invention.

SCM's were employed to perform a topological synthesis in which information was generated to produce a non-dimensional picture of a mechanism. Specifically, the SCM was employed to indicate the number of segments, whether each segment was ground, rigid or flexible, and how the segments were connected to each other—e.g., not connected (0) or connected by a kinematic pair (1), a flexural pivot (2), or a fixed connection (3). The matrix was manipulated by switching the values of each position (except the off-diagonal "0" (unconnected) indicators). For example, if two segments were connected by a kinematic pair (a value of 1), changing the value to a 2 (a flexural pivot) would yield a new mechanism. Generating all possible combinations of mechanisms and eliminating those that were duplicates, violated a basic premise of the desired operation, and failed to produce a resistive force, reduced the number of acceptable slider mechanisms to twenty-eight (all but one of which are shown in FIG. 1a and FIGS. 2a through 2z, the excluded embodiment being found to have not achieved sufficiently near-constant force). The above methodology, while uniquely applied to the desired slider mechanism of this invention, is generally known in the art and therefore will not be described in any further detail.

Figure 1D:
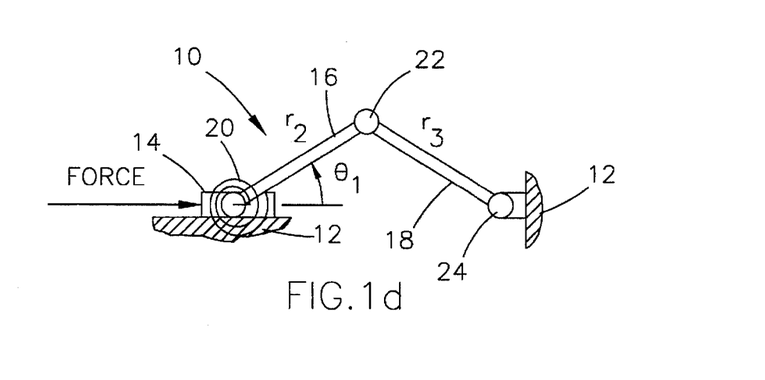

In evaluating the compliant mechanism 10, the compliant first connection 20 can be modeled as a zero free-length torsion spring, as indicated in FIG. 1d. The value of the spring constant k for the torsion spring is based on the equation:

$$k = EI/l = Ebh^3/12l$$

where b, h and l are the width, height and length, respectively, of the flexural pivot formed by the first connector 20, E is the modulus of elasticity, and I is the moment of inertia. The force-deflection characteristics of the compliant mechanism 10 can then be analyzed using a virtual-work approach in which the potential energy of the compliant mechanism 10 based on the spring constant k and the angular displacement $\theta_1$ of the connecting rod 16 relative to the slider 14 from the null position of the connecting rod 16, as represented in FIG. 1d. As used herein, the null position of the connecting rod 16 is the position at which the connecting rod 16 and the crank 18 are collinear with the linear path of the slider 14, and the first connector 20 (also at its null position) does not generate a torsional force about the slider 14.

Using the virtual-work analysis and an iterative approach, it was determined that, regardless of the spring constant of the connector 20, a near-constant value for the output force at the slider 14 is obtained if the length $r_3$ of the crank 18 is about 0.87 of the length $r_2$ of the connecting rod 16. More specifically, once an initial deflection is achieved to move the connecting rod 16 off null, force-deflection analysis using finite element and analysis employing a pseudo-rigid-body approximation showed that the deflection force should not deviate more than about 3.2 percent during a deflection of about forty percent of the total length of the slider's linear path.

Further embodiments of this invention are represented in FIGS. 2a through 2z. As seen, these embodiments differ from the first embodiment of FIG. 1a by having a relocated flexural pivot or including additional flexural pivots, and by including fixed connections and/or compliant segments. These additional embodiments can be categorized as follows: a first group employs only rigid segments and one or more flexural pivots, with the remaining connectors being revolute joints (FIGS. 2a through 2e); a second group employs a rigid connecting rod 16, a compliant crank 18 and a combination of flexural pivots, revolute joints and fixed connections (FIGS. 2f through 2l); a third group employs a compliant connecting rod 16, a rigid crank 18 and a combination of flexural pivots, revolute joints and fixed connections (FIGS. 2m through 2s); and a fourth group employs only compliant segments and one or more fixed connections, with the remaining connectors being revolute joints (FIGS. 2t through 2z).

In the first group, the compliant elements of the mechanism are those connectors 20, 22 and/or 24 that are flexural pivots, characterized by a compliant portion that provides the flexural property when the interconnected members are pivoted relative to each other. In the second group, the compliant elements of the mechanism are those connectors 20 or 24 that are flexural pivots, in combination with the compliant crank 18 and its one or more fixed connectors 22 and/or 24—in effect, the fixed connectors 22 form an integral portion of the compliant crank 18 and can therefore be considered to form a portion of the compliant elements. The compliant elements of the third group are those connectors 24 that are flexural pivots, in combination with the compliant connecting rod 16 and its one or more fixed connectors 20 and/or 22. Finally, the compliant elements of the fourth group are the compliant connecting rod 16, compliant crank 18, and their one or more fixed connectors 20, 22 and/or 24. Though not illustrated, it is foreseeable that further embodiments could be devised, such as by interconnecting a compliant segment with one or more flexural pivots. While such embodiments may differ structurally, they are functional equivalents to the embodiments shown in FIGS. 1a and 2a through 2z, and are therefore within the scope of this invention.

While the above-noted structural variations exist among the embodiments of FIGS. 2a through 2z, each is capable of being evaluated through a virtual-work analysis and an iterative approach, and/or through finite element analysis. With either approach, the analysis is performed to yield a near-constant value for the output force at the slider 14 through the use of appropriate relative spring rates (if more than one flexural pivot is used), relative segment lengths and segment compliance characteristics. Those skilled in the art will recognize that various analytical methods could be employed to ascertain the characteristics of the segments and connectors employed in the slider mechanism to achieve a near-constant output force.

Table I below provides examples of results derived based on the methodology described above. The analysis produced a near-constant output force for each the embodiments depicted in FIGS. 1a and 2a through 2e. The variables $k_1$, $k_2$ and $k_3$ indicate the relative spring rates for the first, second and third connectors 20, 22 and 24, respectively, and the variables $r_2$ and $r_3$ indicate the relative lengths of the connecting rod 16 and crank 18, respectively. A value of "0" for a spring constant denotes that the particular connector is a revolute joint, and therefore does not generate a torsional moment when relative motion occurs between its interconnected segments.

TABLE I

Figure 2B:
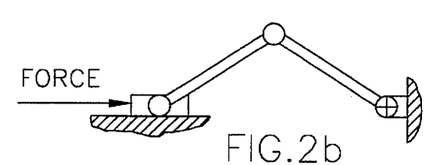
Figure 2C:
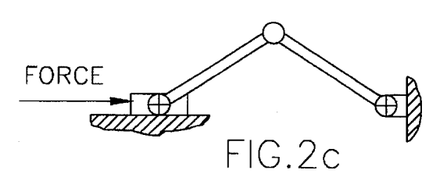
Figure 2D:
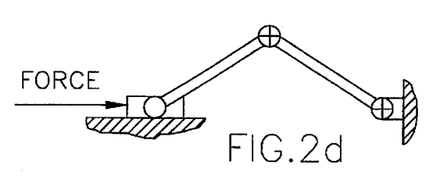
Figure 2E:
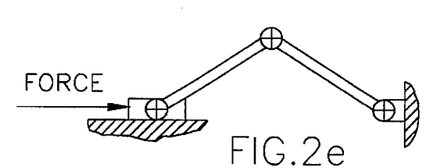
Figure 2F:
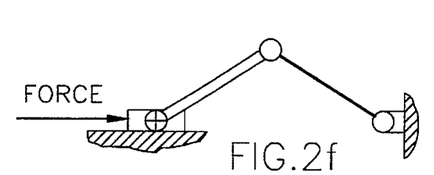
Figure 2G:
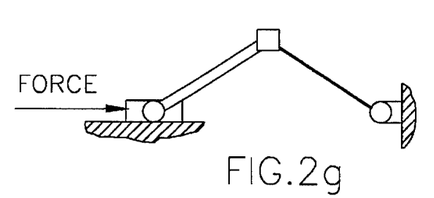
Figure 2H:
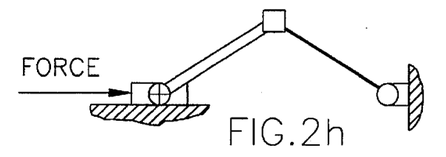
Figure 2I:
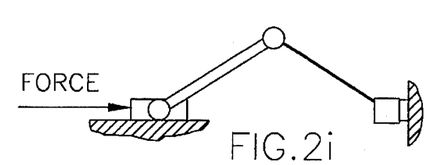
Figure 2J:
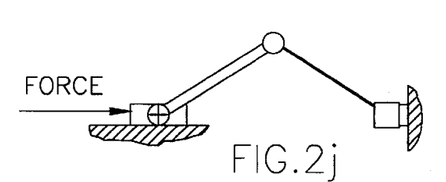
Figure 2K:
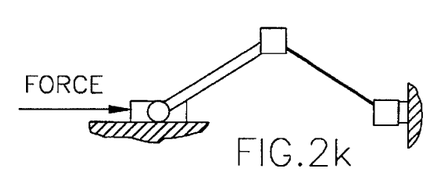
Figure 2L:
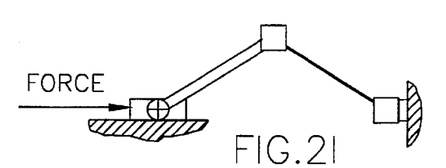

| Embodiment | $k_1$ | $k_2$ | $k_3$ | $r_2$ | $r_3$ |
| --- | --- | --- | --- | --- | --- |
| FIG. 1a | C | 0 | 0 | D | 0.87 D |
| FIG. 2a | 2.75 C | C | 0 | D | 0.63 D |
| FIG. 2b | 0 | 0 | C | D | 1.14 D |
| FIG. 2c | C | 0 | 4.25 C | D | 1.50 D |
| FIG. 2d | 0 | C | 4.15 C | D | 1.50 D |
| FIG. 2e | C | C | 8.45 C | D | 1.50 D |

As is apparent from the above, an arbitrary spring rate C can be selected for any single connector 20, 22 or 24 designated as a flexural pivot, and the spring rates of any additional connectors 20, 22 and/or 24 designated as flexural pivots are dependent on the arbitrary spring rate C. Similarly, an arbitrary segment length D can be selected for the connecting rod 16 or the crank 18, with the length of the other segment being dependent on the arbitrary segment length D. Though Table I does not provide parameters for the remaining embodiments of this invention, the identical methodology is employed. The presence of compliant segments necessitates the use of a pseudo-rigid-body model in which each compliant segment is modeled as two rigid segments interconnected by a torsion spring.

Figure 2M:
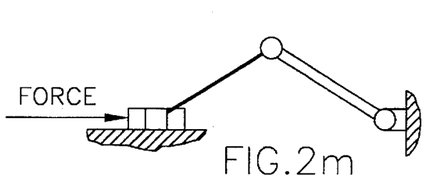
Figure 2N:
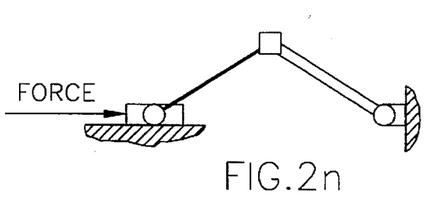
Figure 2O:
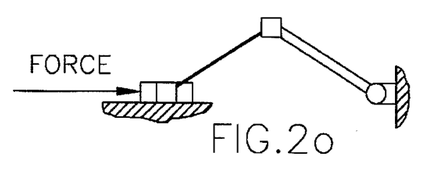
Figure 2P:
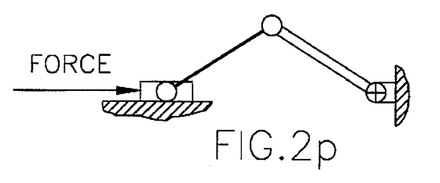
Figure 2Q:
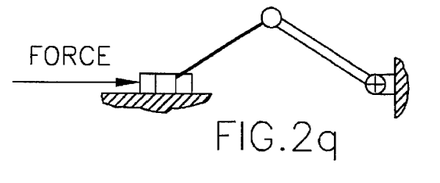
Figure 2R:
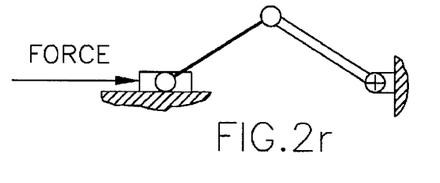
Figure 2S:
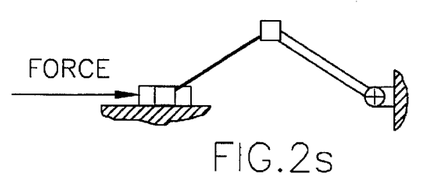
Figure 2T:
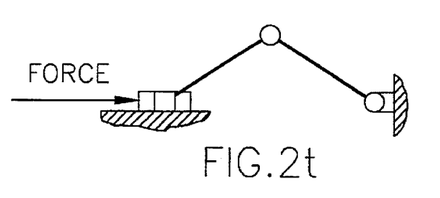
Figure 2U:
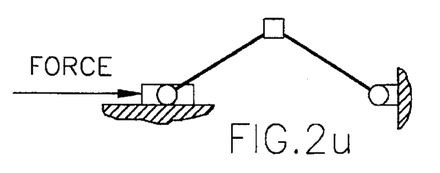
Figure 2V:
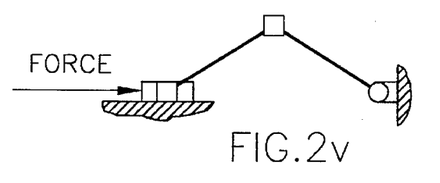
Figure 2W:
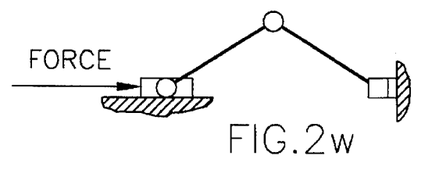
Figure 2X:
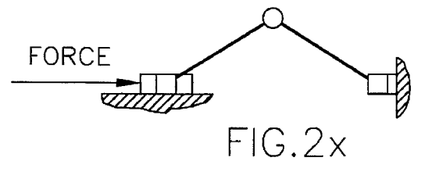
Figure 2Y:
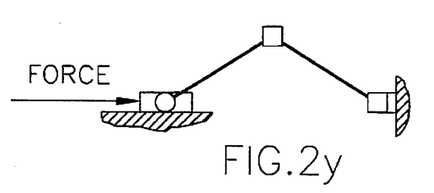
Figure 2Z:
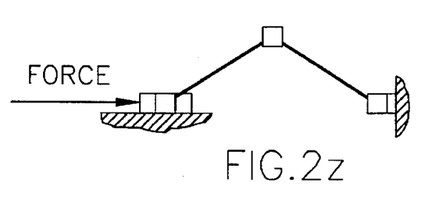
Figure 3A:
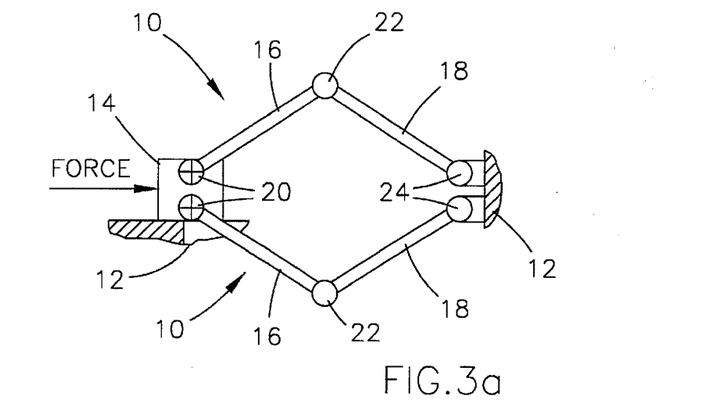
FIGS. 3a and 3b are schematic representations of compliant mechanisms incorporating multiple slider mechanisms of this invention.
Figure 3B:
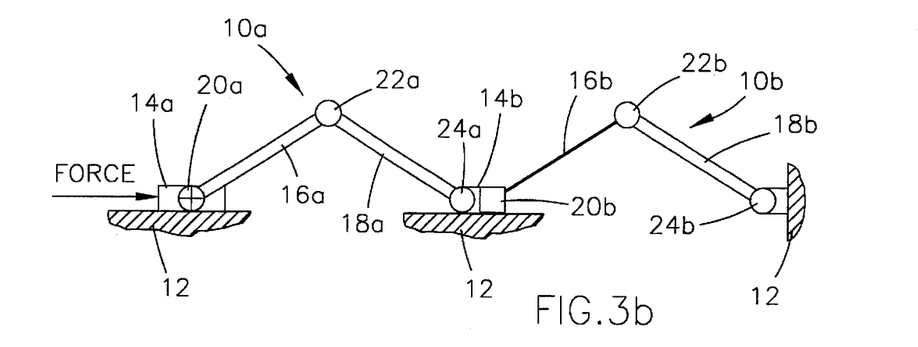

In addition to the embodiments of FIGS. 1a and 2a through 2z, any two or more of these embodiments can be combined in parallel and/or in series to produce a compound compliant mechanism, as indicated by FIGS. 3a and 3b. FIG. 3a employs two parallel compliant mechanisms 10 of the type shown in FIG. 1a, while FIG. 3b employs two in-line compliant mechanisms of the types shown in FIGS. 1a and 2m. An in-parallel mechanism such as that of FIG. 3a is advantageous in that side loading can be compensated, while an in-series mechanism such as that of FIG. 3b can be used for successive release when an over-force condition occurs. As such, the compliant four-bar slider mechanism of this invention is a very basic building block for a multitude of mechanisms and applications. Each slider mechanism of a compound compliant mechanism can be separately analyzed to yield a near-constant output force to ensure that the combination will also produce a near-constant output force.

Figure 5:
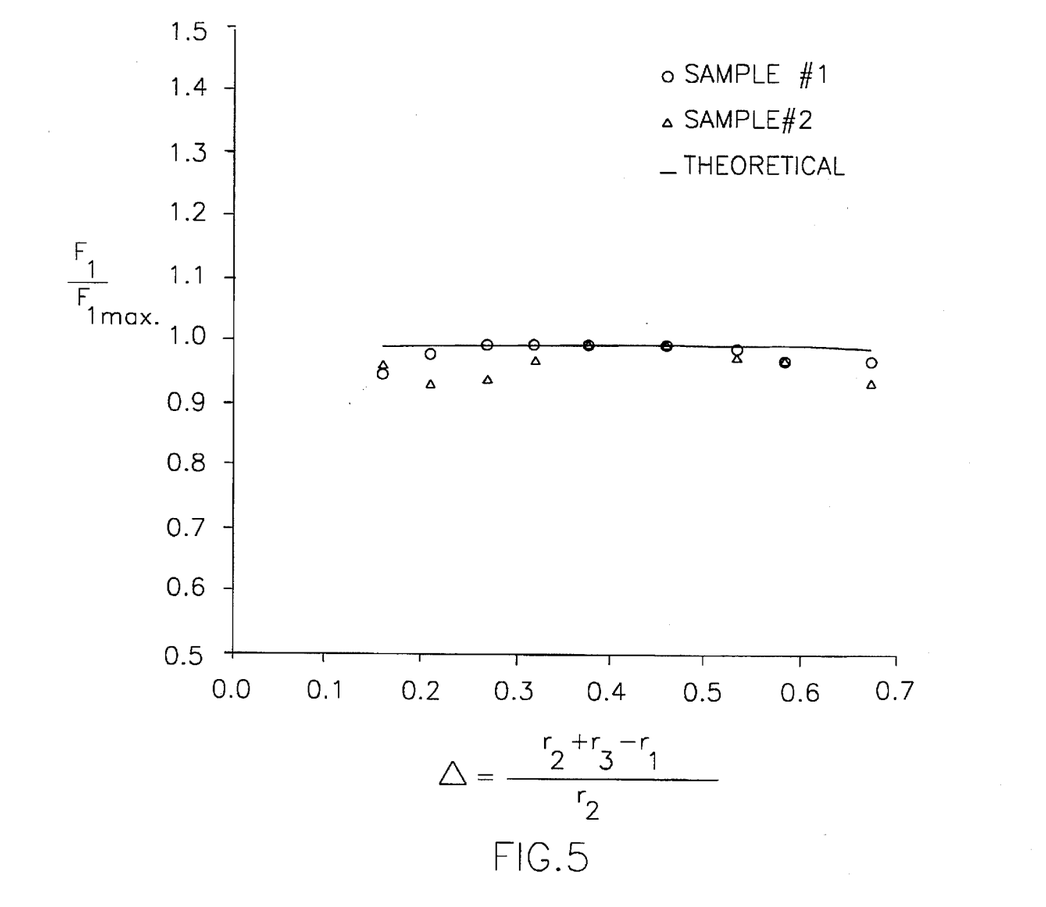
FIG. 5 is a graphical representation of output force to input displacement for a compliant mechanism of this invention.

FIG. 5 represents a comparison of predicted versus actual force deflection relations on two experimental mechanisms constructed with two of the compliant mechanisms of FIG. 2m in parallel, similar in arrangement to that shown in FIG. 3a. The geometric and material properties of each of the experimental mechanisms were as indicated in Table II:

TABLE II

| | Connecting Rod | Crank |
| --- | --- | --- |
| Segment Type: | Compliant | Rigid |
| Material: | Nylon | Aluminum |
| Length: | 73 mm | 54 mm |
| Width: | 2.4 mm | |
| Height: | 2.4 mm | |
| Modulus of Elasticity: | 3000 MPa | |

For analysis, the nylon material was assumed to behave elastically. In FIG. 5, $F_1$ is the output force at the slider 14 while $F_{1max}$ is the maximum value for the output force over the tested deflection. The deflection $\Delta$ was limited between 0.15 and 0.65 of the ratio of the tested deflection of the slider 14 to the length of the connecting rod 16. The deviations from theoretical indicated in FIG. 5 were attributed to variations within the samples in their geometrical properties due to manufacturing tolerances, friction at the slider/base interface, and the assumptions made as to the material used. Yet, as illustrated in FIG. 5, a near-constant force is obtainable for a significant range of deflection of the compound compliant mechanism. Furthermore, the force-deflection relationship can be accurately predicted by employing the pseudo-rigid-body model.

Figure 4:
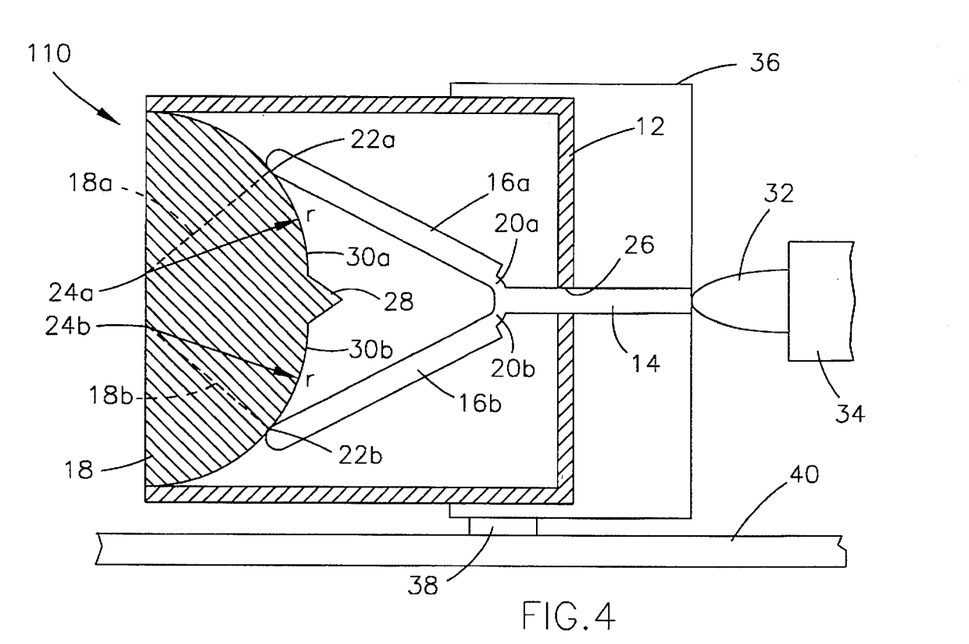
FIG. 4 shows in cross-section a very-near-constant-force mechanism employed to maintain a constant pressure in an electrical connector incorporating two four-bar slider mechanisms of this invention that have been combined in parallel to create a six-bar slider.

FIG. 4 illustrates a practical application for the teachings of this invention. The Figure shows an electrical connection 110 for use in electrically interconnecting a lead 32 of a chip 34 to a flex connector 36. As shown, the flex connector 36 is attached to the connection 110 and soldered to a pad 38 on a circuit board 40. The connection 110 can be described as analogous to the compound compliant mechanism 10 shown in FIG. 3a, in which a single flexural pivot is provided for each slider mechanism. More specifically, each slider mechanism includes a base member in the form of a frame 12, a body 18 disposed within the frame 12, a substantially rigid connecting rod 16a or 16b, and a flexural pivot 20a or 20b. The flexural pivots 20a and 20b are each connected to a common slider 14 disposed within an aperture 26 formed by the frame 12. The aperture 26 delimits a linear path for the slider 14 over which the slider 14 reciprocates, such that the input to the electrical connection 110 is the displacement of the slider 14 along its linear path.

Within the frame 12, the body 18 defines a pair of arcuate surfaces 30a and 30b, one surface 30a or 30b being provided for each of the slider mechanisms. The arcuate surfaces 30a and 30b are each disposed a radial distance r from corresponding datums 24a and 24b on the frame 12. The connecting rods 16a and 16b have contact ends 22a and 22b, respectively, that slidably contact the arcuate surface 30a or 30b of the body 18. A radius 18a and 18b is defined between each datum 24a and 24b on the frame 12 and the center of its corresponding contact end 22a and 22b (i.e., the radii 18a and 18b include the radial distance r plus the radius of their respective contact ends 22a and 22b). These radii 18a and 18b are equivalent to a crank of a slider mechanism. Furthermore, the intersection of each radius 18a and 18b and the frame 12 is equivalent to a revolute joint of a slider mechanism, and the contact ends 22a and 22b of the connecting rods 16a and 16b are equivalent to second revolute joints of the slider mechanisms between the connecting rods 16a and 16b and their respective radii (cranks) 18a and 18b. Consequently, as used herein, the terms "segment" and "connector" need not be physical or tangible members of a slider mechanism of this invention, but can be a virtual or resultant member generated by the geometric interrelationships of the physical members of the slider mechanism. For example, a segment can be a radius defined between two interacting members, a connector can be a geometric intersection between a segment and a radius, and the "pivotable interconnection" achieved by a connector can be in the geometric sense, as is the case with the connection 110 shown in FIG. 4.

As described above, the flexural pivots 20a and 20b form biasing elements. Each flexural pivot 20a and 20b is preferably formed to have a null position when its respective radius (crank) 18a or 18b and connecting rod 16a and 16b are approximately collinear with the linear path so as to generate a torsional force between each connecting rod 16a and 16b and the slider 14 of approximately zero. A crest 28 separates the arcuate surfaces 30a and 30b in order to ensure that the contact ends of the connecting rods 16a and 16b are biased away from their collinear orientations when the displacement of the slider 14 is initiated. Furthermore, the lengths of the radii 18a and 18b and the connecting rods 16a and 16b are such that the biasing effect causes each slider mechanism to generate a near-constant output force parallel to the linear path of the slider 14 in response to the displacement of the slider 14 along the linear path.

Alternatively, either or both connecting rods 16a and 16b could be a compliant segment, and therefore constitute a portion of the biasing elements of their respective slider mechanisms. In this configuration, either or both flexural pivots 20a and 20b could instead be fixed connections interconnecting the compliant connecting rods 16a and 16b to the slider 14, such that the combination of the compliant connecting rods 16a and 16b and the fixed connections would constitute the biasing element of the slider mechanism.

In use, an electrical connection 110 is preferably provided for each chip lead 32. As the chip 34 is placed on the circuit board 40, each of its leads 32 are registered with a corresponding flex connector 36 attached to the connection 110. The connection 110 ensures that, during placement of the chip 34 on the board 40, a near-constant force is exerted between the lead 32 and the flex connector 36, which can therefore be constructed to have a relative low strength. As such, the electrical connection 110 ensures a reliable contact between the lead 32 and flex connector 36 without overstressing the flex connector 36.

From the above, it can be seen that a significant advantage of the present invention is that a compliant mechanism is provided that can be readily configured to generate a substantially constant output force in response to an input in the form of a linear displacement. More particularly, the compliant mechanism includes one or more slider mechanisms, each of which having one or more compliant members and/or connections. The compliant element or elements generate a biasing force that causes the slider mechanism to generate a substantially constant output force in response to an input displacement. Therefore, the capability for generating a near-constant output force is due in part to the presence of the one or more compliant elements within the compliant mechanism.

A significant advantage of such a capability is that, for a given application, the force necessary to displace an input member a given distance can be determined and controlled to a degree necessary to prevent fracture or plastic deformation of the components on which the force is applied. Consequently, devices incorporating the compliant mechanism of this invention can be employed with greater repeatability so as to enhance manufacturability and greater reliability so as to minimize scrappage. Furthermore, the use of compliant elements within the compliant mechanism makes possible a mechanism that can be manufactured with conventional materials and processing methods so as to yield a relatively light weight and inexpensive device.

While our invention has been described in terms of a preferred embodiment, it is apparent that other forms could be adopted by one skilled in the art. For example, while constant force mechanisms are the focus of the above discussion, those skilled in the art will recognize that the unique properties of the compliant mechanism of this invention enable many different variations of input-output relationships. In addition, it is foreseeable that the compliant mechanism of this invention could be modified by substituting appropriate materials, or by utilizing the compliant mechanism in alternative applications, or by reconfiguring the compliant mechanism to differ from those shown in the Figures, such as by interconnecting a compliant segment with one or more flexural pivots. Accordingly, the scope of our invention is to be limited only by the following claims.

The embodiments of the invention in which an exclusive property or privilege is claimed are defined as follows:

1. A compliant mechanism that generates a substantially constant output force in response to an input in the form of a linear displacement, the compliant mechanism having a four-bar slider mechanism comprising:

a base member forming a frame of the slider mechanism;

a first segment adjacent the base member, the first segment constituting a crank of the slider mechanism;

a first connector pivotably interconnecting the first segment to the base member;

a second segment adjacent the first segment, the second segment constituting a connecting rod of the slider mechanism;

a second connector pivotably interconnecting the second segment to the first segment;

a reciprocable member constituting a slider of the slider mechanism, the reciprocable member being limited to reciprocating movement along a solitary linear path that is spatially fixed relative to the base member, the input to the slider mechanism being the displacement of the reciprocable member along the linear path; and a third connector pivotably interconnecting the second segment to the reciprocable member;

wherein at least one of the first, second and third connectors forms at least a portion of a means for biasing the first and second segments to be collinear with the linear path of the reciprocable member, the biasing means having a null position when the first and second segments are collinear so as to generate a torsional moment about the reciprocable member of approximately zero when the first and second segments are collinear; and wherein the lengths of the first and second segments are such that the biasing means causes the slider mechanism to generate a substantially constant force output parallel to the linear path of the reciprocable member in response to the displacement of the reciprocable member along the linear path.

2. A compliant mechanism as recited in claim 1 wherein the first and second segments are rigid and at least one of the first, second and third connectors is a flexural pivot, the flexural pivot constituting the biasing means of the slider mechanism.

3. A compliant mechanism as recited in claim 2 wherein at least one of the first, second and third connectors is a revolute joint.

4. A compliant mechanism as recited in claim 2 wherein two of the first, second and third connectors are flexural pivots.

5. A compliant mechanism as recited in claim 2 wherein each of the first, second and third connectors is a flexural pivot.

6. A compliant mechanism as recited in claim 1 wherein one of the first and second segments is a rigid segment and one of the first and second segments is a compliant segment, the compliant segment constituting a portion of the biasing means of the slider mechanism.

7. A compliant mechanism as recited in claim 6 wherein one of the first, second and third connectors is a flexural pivot interconnecting the rigid segment to another member of the slider mechanism, the flexural pivot constituting a portion of the biasing means of the slider mechanism.

8. A compliant mechanism as recited in claim 6 wherein at least one of the first, second and third connectors is a fixed connection interconnecting the compliant segment to another member of the slider mechanism, the compliant segment and the fixed connection constituting at least a portion of the biasing means of the slider mechanism.

9. A compliant mechanism as recited in claim 8 wherein two of the first, second and third connectors are fixed connections interconnecting the compliant segment to two other members of the slider mechanism, the compliant segment and the fixed connections constituting the biasing means of the slider mechanism.

10. A compliant mechanism as recited in claim 1 wherein each of the first and second segments is a compliant segment and at least one of the first, second and third connectors is a fixed connection interconnecting one of the compliant segments to another member of the slider mechanism, the compliant segments and the fixed connection constituting the biasing means of the slider mechanism.

11. A compliant mechanism as recited in claim 10 wherein at least one of the first, second and third connectors is a revolute joint.

12. A compliant mechanism as recited in claim 10 wherein two of the first, second and third connectors are fixed connections.

13. A compliant mechanism as recited in claim 10 wherein each of the first, second and third connectors is a fixed connection.

14. A compliant mechanism as recited in claim 1 wherein the compliant mechanism comprises two of the slider mechanisms in series.

15. A compliant mechanism as recited in claim 1 wherein the compliant mechanism comprises two of the slider mechanisms in parallel.

16. An electrical connector incorporating the compliant mechanism recited in claim 1.

17. A compliant mechanism that generates a substantially constant output force in response to an input in the form of a linear displacement, the compliant mechanism having a four-bar slider mechanism comprising:

a base member forming a frame of the slider mechanism;

a crank adjacent the base member;

a first connector pivotably interconnecting the crank to the base member;

a connecting rod adjacent the crank;

a second connector pivotably interconnecting the connecting rod to the crank;

a reciprocable member constituting a slider of the slider mechanism, the reciprocable member being limited to reciprocating movement along a solitary linear path that is spatially fixed relative to the base member, the input to the slider mechanism being the displacement of the reciprocable member along the linear path; and a third connector pivotably interconnecting the connecting rod to the reciprocable member;

wherein at least one of the first, second and third connectors forms at least a portion of a means for biasing the crank and the connecting rod to be collinear with the linear path of the reciprocable member, the biasing means having a null position when the crank and the connecting rod are collinear so as to generate a torsional moment about the reciprocable member of approximately zero when the crank and the connecting rod are collinear;

wherein the base member and the reciprocable member are rigid; and wherein the lengths of the crank and the connecting rod are such that the biasing means causes the slider mechanism to generate a force output parallel to the linear path of the reciprocable member in response to the displacement of the reciprocable member along the linear path, the force output deviating not more than about 3.2 percent during a displacement of at least 40 percent of the length of the linear path.

18. A compliant mechanism as recited in claim 17 wherein the crank and the connecting rod are rigid and at least one of the first, second and third connectors is a flexural pivot, the flexural pivot constituting the biasing means of the slider mechanism.

19. A compliant mechanism as recited in claim 18 wherein at least one of the first, second and third connectors is a revolute joint.

20. A compliant mechanism as recited in claim 18 wherein two of the first, second and third connectors are flexural pivots.

21. A compliant mechanism as recited in claim 18 wherein each of the first, second and third connectors is a flexural pivot.

22. A compliant mechanism as recited in claim 17 wherein one of the crank and the connecting rod is a rigid segment and one of the crank and the connecting rod is a compliant segment, the compliant segment constituting a portion of the biasing means of the slider mechanism.

23. A compliant mechanism as recited in claim 22 wherein one of the first, second and third connectors is a flexural pivot interconnecting the rigid segment to another member of the slider mechanism, the flexural pivot constituting a portion of the biasing means of the slider mechanism.

24. A compliant mechanism as recited in claim 22 wherein at least one of the first, second and third connectors is a fixed connection interconnecting the compliant segment to another member of the slider mechanism, the compliant segment and the fixed connection constituting at least a portion of the biasing means of the slider mechanism.

25. A compliant mechanism as recited in claim 24 wherein two of the first, second and third connectors are fixed connections interconnecting the compliant segment to two other members of the slider mechanism, the compliant segment and the fixed connections constituting the biasing means of the slider mechanism.

26. A compliant mechanism as recited in claim 17 wherein the crank and the connecting rod are compliant segments and at least one of the first, second and third connectors is a fixed connection interconnecting one of the compliant segments to another member of the slider mechanism, the compliant segments and the fixed connection constituting the biasing means of the slider mechanism.

27. A compliant mechanism as recited in claim 26 wherein one of the first, second and third connectors is a revolute joint.

28. A compliant mechanism as recited in claim 26 wherein two of the first, second and third connectors are fixed connections.

29. A compliant mechanism as recited in claim 26 wherein each of the first, second and third connectors is a fixed connection.

30. A compliant mechanism as recited in claim 17 wherein the compliant mechanism comprises two of the slider mechanisms in series.

31. A compliant mechanism as recited in claim 17 wherein the compliant mechanism comprises two of the slider mechanisms in parallel.

32. An electrical connector incorporating the compliant mechanism recited in claim 17.

* * * * *